Figure 1:
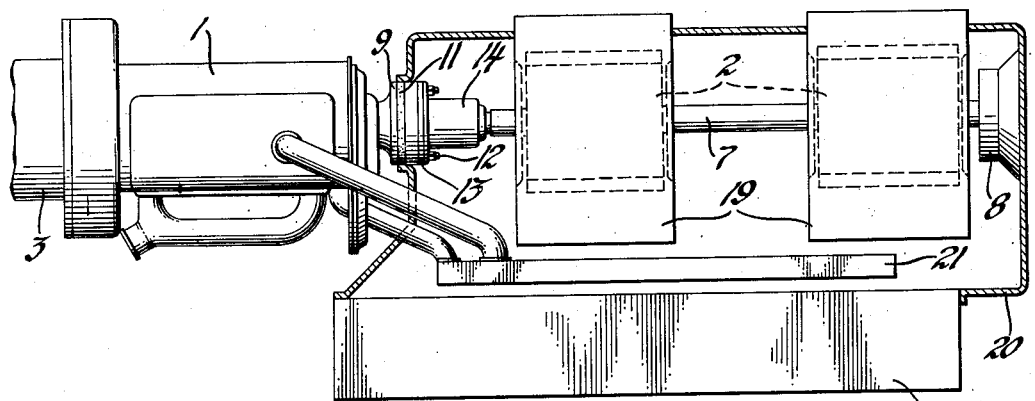

Nov. 29, 1949  L. A. NELSON  2,489,536
ONE-WAY DRIVE FOR AIR CONDITIONING BLOWERS
Filed Sept. 21, 1946

Inventor
Laurence A. Nelson
By Spencer, Willits, Helwig & Baillio
Attorneys

Patented Nov. 29, 1949

2,489,536

UNITED STATES PATENT OFFICE 2,489,536

ONE-WAY DRIVE FOR AIR CONDITIONING BLOWERS

Laurence A. Nelson, Pontiac, Mich., assignor to General Motors Corporation, Detroit, Mich., a corporation of Delaware Application September 21, 1946, Serial No. 698,477

5 Claims. (Cl. 62—115)

When railway cars and motor vehicles are equipped with refrigeration mechanism, either for the preservation of freight or as a part of a passenger compartment air conditioning system, the mechanism is often driven intermittently under control of temperature responsive apparatus. As compartment temperature rises to a predetermined thermostat setting the drive is automatically initiated and continues in operation until a given temperature drop is obtained and then stops for a later repetition of the cycle as called for by the temperature of the space to be regulated. For the dissipation of heat an air cooled condenser is employed and if an internal combustion engine furnishes the motive power its liquid cooling system includes the usual radiator structure arranged in tandem with the condenser and for the passage of cooling air therethrough. The most efficient flow of air can be had by the use of motor driven centrifugal blower fans. As ordinarily constructed such rotary fans are of light weight and accurately balanced for easy free running. However, their use heretofore has been considered impractical in an installation of the character referred to and other more expensive and less efficient expedients have been resorted to. Contributing to the difficulty is the fact that when the compressor is operating under high ambient temperatures the refrigerant pressures are proportionately high and when the power is cut off the compressor acts as a brake in bringing the power source to a standstill almost instantly. Because the deceleration rate is so high it has not been feasible to construct centrifugal blowers capable of withstanding inertia forces and all attempts with solid fan drives have proved unsuccessful.

As a practical solution to the problem it is now proposed to protect the inherently flimsy centrifugal blower wheels from destructive inertia forces through the provision of a one-way clutch combined with a rubber insulated coupling. The one-way drive enables the blower to spin freely upon the abrupt stop of the compressor drive means and to continue overrunning to a gradual and slow stop. Furthermore, with one directional drive an important advantage is obtained when an internal combustion engine is employed as the driving medium in that changes in angular velocity of the crankshaft is transmitted to the blowers in the positive or driving direction only thereby materially reducing to at least one-half the crank-shaft torsions transmitted to the blowers and this is of considerable consequence in minimizing fatigue. The transmission of crankshaft high frequency vibrations is cushioned by the rubber insulation incorporated in the coupling.

Figure 2:
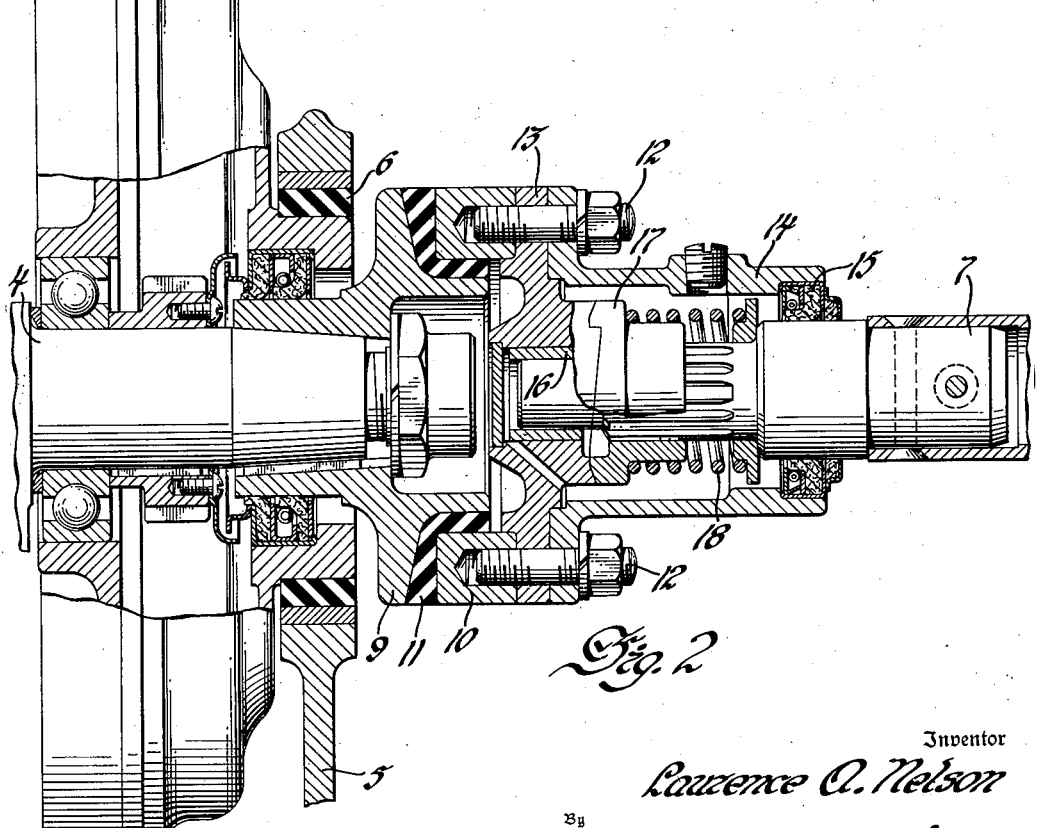

For a more complete description reference will be made to the accompanying drawing wherein Figure 1 is a plan view showing the preferred relation of compressor, engine, blowers, radiator and condenser and Figure 2 is a detail sectional view of the fan drive coupling device.

For simplification the drawings omit a detailed showing of the refrigeration system as such and its controls since these may be of any conventional type. Any suitable form of drive motor may be employed and that here contemplated consists of a multiple cylinder internal combustion engine 1 serving as a common drive for both the blowers 2 and the compressor 3, which for convenience of design are joined to opposite ends of the engine crankshaft 4 with the engine and compressor forming a unit assembly and having their respective driving and driven shafts bolted or solidly coupled to one another. A supporting bracket 5 lined with a cushion band 6, of rubber or the like, embraces a circular projection of the engine timing gear cover.

Keyed to and held on the tapered end of the crankshaft 4 is a coupling device for the blower fan shaft 7, whose opposite end is journaled in a support 8. The coupling includes a driving member 9 having telescoped thereon and in spaced relation thereto a bolting ring 10 with an L-sectioned ring 11 of rubber or other nonmetallic elastic deformable material vulcanized or surface bonded to the adjoining surfaces of the metal members 9 and 10 whose cooperating radial surfaces are outwardly divergent in relation to one another so that the connecting rubber increases in width as its dimension increases away from the rotational axis.

A series of studs 12 fasten to the ring 10 the driving element 13 of a claw clutch and a hollow lubricant containing casing 14 which terminates in a wiper seal assembly 15 embracing the adjacent end of the fan drive shaft 7. A reduced end portion of the fan shaft 7 is piloted by and rotatably supported in a bearing bushing 16 carried by the driving member 13 whose claw tooth formations are engaged by mating clutch teeth on the end of a driven clutch collar 17 slidably splined on the fan shaft and yieldably urged forward by a constant pressure coil spring 18 to afford the one-way blower drive.

Each of the rotary blowers 2—2 are contained within discharge housings 19 and draw in air centrally thereof from the inside of an enclosure housing 20 containing the engine cooling radiator 21 and the refrigerant condenser 22 arranged one behind the other.

From the above description it will be seen that the blowers will produce flow of cooling air and will continue to spin freely in space to a gradual rest under their inertia forces notwithstanding abrupt stopping of the compressor drive unit.

I claim:

1. In a refrigerating system, a refrigerant compressor unit, an intermittently operated internal combustion engine solidly drive coupled with the compressor, an engine cooling radiator and a refrigerant condenser arranged for air flow therethrough, a centrifugal blower for producing air flow through the radiator and the condenser, a drive coupling between the engine and the centrifugal blower including both a power transmitting resilient joint and a one-way overrunning clutch in tandem drive relation.

2. In combination, a compressor drive unit, a fan to be driven therefrom, a drive coupling including a driving member keyed to and supported by the power delivery shaft of the unit, a driven member providing a bearing support for one end of the fan drive shaft, nonmetallic elastic deformable material surface bonded to both members to transmit drive and to support one from the other, and a spring pressed collar slidably splined on the fan drive shaft and formed with claw clutch formations to engage mating clutch formations on said driven member.

3. In a refrigerating system, a compressor drive unit arranged for intermittent operation, a centrifugal blower having a supporting and driving shaft axially aligned with said drive unit, a supporting bearing for one end of the shaft, a combined supporting and drive transmitting coupling for the other end of said shaft, said coupling embodying in series relation a flexible cushioning member and a one-way overrunning clutch which allows said shaft to spin freely under inertia forces upon abrupt stopping of drive unit operation.

4. In a refrigerating system, an internal combustion engine and a compressor solidly coupled together for unisonal operation, a centrifugal air blower having a supporting and driving shaft and a drive coupling joining said shaft with the engine and compressor and embodying a one-way overrunning clutch which frees the spinning blower from abrupt stopping upon engine deceleration.

5. In a refrigerating system, a refrigerant compressor unit, an air cooled condenser, an internal combustion engine solidly drive coupled to the compressor unit, an air cooled radiator for engine cooling medium, a lightweight centrifugal blower for forcing air flow through the condenser and the radiator and a one-way overrunning drive coupling between the centrifugal blower and the engine which frees the blower from engine deceleration forces and enables the blower to spin on freely under its own inertia.

LAURENCE A. NELSON.

REFERENCES CITED

The following references are of record in the file of this patent:

UNITED STATES PATENTS

| Number | Name | Date |
| --- | --- | --- |
| 554,138 | Negbaur et al. | Feb. 4, 1896 |
| 1,039,099 | Cook et al. | Sept. 24, 1912 |
| 1,021,116 | Ure | Mar. 26, 1912 |
| 1,455,910 | Domarus, Jr. | May 22, 1923 |
| 1,832,726 | Newcomb | Nov. 17, 1931 |
| 1,833,987 | Chryst | Dec. 1, 1931 |

FOREIGN PATENTS

| Number | Country | Date |
| --- | --- | --- |
| 462,115 | Great Britain | Mar. 1, 1937 |
| 298,519 | Great Britain | Oct. 8, 1928 |